(12) United States Patent
van der Gaast

(10) Patent No.: US 8,483,377 B2
(45) Date of Patent: Jul. 9, 2013

(54) DOWNLOADABLE RINGTONES FOR USAGE IN EMERGENCY SITUATIONS

(75) Inventor: T. van der Gaast, Huizen (NL)

(73) Assignee: Alcatel Lucent, Paris (FR)

( * ) Notice: Subject to any disclaimer, the term of this patent is extended or adjusted under 35 U.S.C. 154(b) by 1267 days.

(21) Appl. No.: 12/274,003

(22) Filed: Nov. 19, 2008

(65) Prior Publication Data

US 2009/0136008 A1 May 28, 2009

(30) Foreign Application Priority Data

Nov. 20, 2007 (EP) ..................................... 07121112

(51) Int. Cl.
*H04M 3/42* (2006.01)
(52) U.S. Cl.
USPC ........ 379/207.16; 379/37; 379/49; 455/404.1
(58) Field of Classification Search
USPC ................ 379/49, 40, 37, 41, 48, 50, 207.16; 455/404.1
See application file for complete search history.

(56) References Cited

U.S. PATENT DOCUMENTS

| 5,937,355 | A * | 8/1999 | Joong et al. .................... 455/466 |
| 6,724,861 | B2 * | 4/2004 | Newland et al. ................ 379/49 |
| 7,809,376 | B2 * | 10/2010 | Letourneau et al. .......... 455/445 |
| 2002/0171552 | A1 | 11/2002 | Tate |
| 2004/0193617 | A1 | 9/2004 | Adler |
| 2007/0149167 | A1 | 6/2007 | Lee |
| 2008/0171559 | A1 * | 7/2008 | Frank et al. ................ 455/456.5 |
| 2008/0214207 | A1 * | 9/2008 | Karabinis .................. 455/456.1 |

FOREIGN PATENT DOCUMENTS

WO  WO 2006/066629 A1  6/2006

OTHER PUBLICATIONS

European Search Report.

* cited by examiner

*Primary Examiner* — Disler Paul
(74) *Attorney, Agent, or Firm* — Fay Sharpe LLP

(57) ABSTRACT

The invention relates to the usage of downloadable ringtones for communication devices in emergency situations. Emergency Alert systems such as air raid sirens inform the population that an emergency has occurred, however, they do not provide any information about the type of emergency and the actions to be taken. By sending emergency messages to the communication devices within an emergency area which are played back aloud, more detailed emergency information can be provided to a large part of the population affected.

6 Claims, 1 Drawing Sheet

DOWNLOADABLE RINGTONES FOR USAGE IN EMERGENCY SITUATIONS

Figure 1:
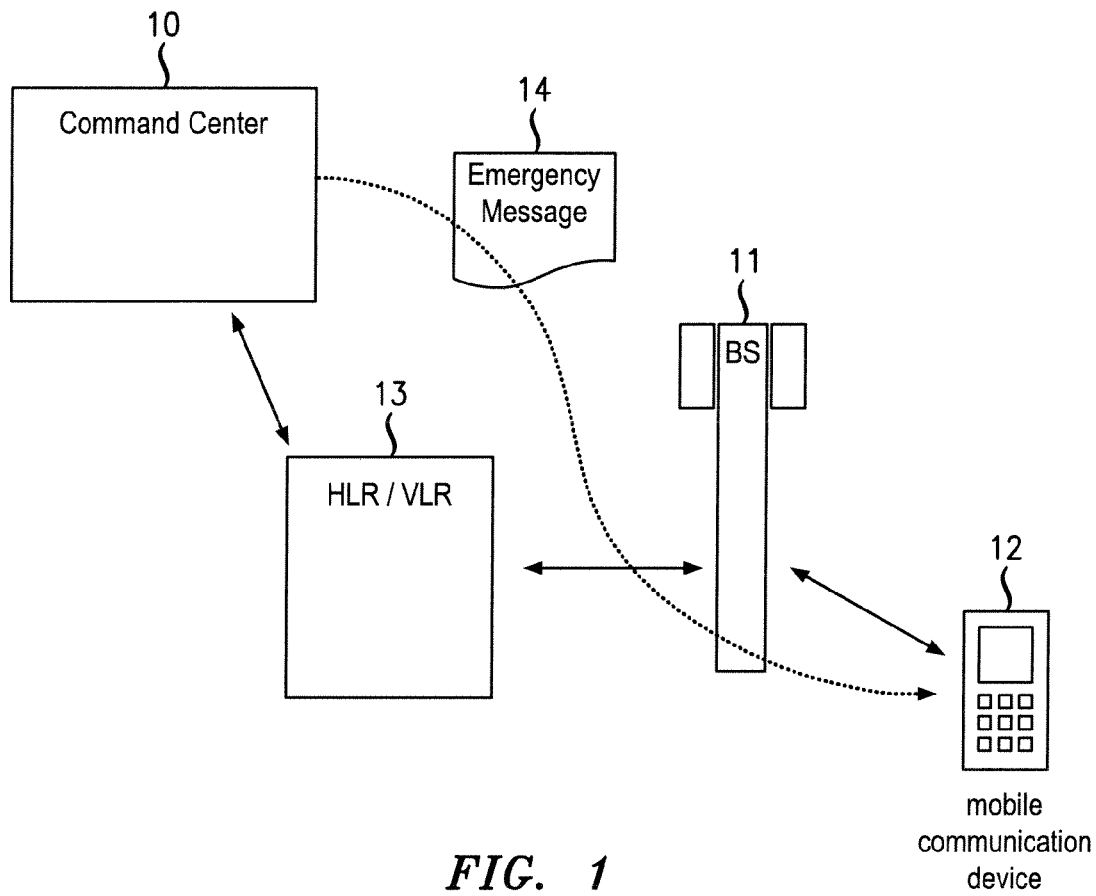

The invention relates to the usage of downloadable ringtones for communication devices in emergency situations.

An emergency is a situation which poses an immediate risk to health, life, property and/or environment. Most emergencies require urgent intervention to prevent a worsening of the situation. There are many protocols that emergency services use in dealing with an emergency, which usually start with planning before an emergency occurs. One commonly used system consists of four phases arranged in a circle, a preparedness phase, a response phase, a recovery phase and a mitigation phase.

The planning phase starts at preparedness, where the agencies decide on how they will respond to a given incident or set of circumstances. This should ideally include lines of command and control, and division of activities between agencies. Following an emergency, the agencies then move to a response phase, where they execute their plans, and may end up improvising some areas of their response (due to gaps in the planning phase, which are inevitable due to the individual nature of most incidents). Agencies may then be involved in recovery following the incident, where they assist in the clear up from the incident, or help the people involved overcome their mental trauma. The final phase in the circle is mitigation which involves taking steps to ensure that no re-occurrence is possible, or putting additional plans in place to ensure that less damage is done. This should feed back in to the preparedness stage, with updated plans in place to deal with future emergencies, thus completing the circle.

In the preparedness phase, emergency managers develop plans of action for when the disaster strikes. Common preparedness measures include the

- communications plan with easily understandable terminology and chain of command;
- development and practice of multi-agency coordination and incident command;
- proper maintenance and training of emergency services;
- development and exercise of emergency population warning methods combined with emergency shelters and evacuation plans; and
- stockpiling, inventory, and maintenance of supplies and equipment.

An emergency population warning method allows local, regional, or national authorities to contact members of the public en masse and to warn them of an impending emergency. These warnings may be necessary for a number of reasons, including:

- weather emergencies such as tornadoes, hurricanes, and ice storms;
- geological disasters such as earthquakes, landslides, volcanic eruptions, and tsunamis;
- industrial disasters such as the release of toxic gas or contamination of river water;
- radiological disasters such as a nuclear plant disaster;
- medical emergencies such as an outbreak of a fast-moving infectious disease; and
- warfare or acts of terrorism.

In order to develop an effective emergency population warning system, certain things are required:

- an agreement as to what constitutes an emergency in the area served by the system. This differs from region to region depending on the local climate, geology, and the like;
- an agreement as to who can initiate an alert. In some countries all warnings are transmitted by a single command center, while in others (such as the United States) a host of local, regional, and national agencies are authorized to initiate warnings;
- a system or systems by which the information can be quickly transmitted to the population; and
- an educational program to teach the general public how to recognize an alert or what to do if a warning is broadcast.

Despite the fears of many that alerts will panic the population, evidence from the Emergency Alert System (EAS) which is used in the United States show that this is almost unheard of. Both broadcasters and viewers are far more likely to ignore warnings than they are to panic over them. Therefore, it is essential to develop systems, which carry the emergency warnings and reach a large amount of people, and that give clear instructions on what is to be done.

In many countries, air raid sirens are used to warn the population of weather emergencies or warfare. Emergencies are regularly also communicated via TV and Radio broadcast. In some cases, people living near nuclear facilities have special radios in their home that are set to broadcast a warning signal in the event of a radiological emergency. Some emergency alerts are also sent out via Email.

The existing emergency warning systems have a certain number of drawbacks. Sirens do reach a large number of people in a specific area, however, they only inform the people that there is an emergency, while they do not carry the information about the type of emergency and about the actions that are to be taken. On the other hand, systems such as TV and Radio broadcast and Email do allow the distribution of specific emergency information and the required actions, however, they are passive systems and there is a risk that people do not watch TV, listen to the radio or instantly read their Email.

The present invention provides a method and a system for distributing emergency warnings over a communication network that overcome the drawbacks of the prior art.

According to an aspect of the invention, when an emergency situation occurs, emergency messages are created. The emergency messages may comprise a warning signal and a spoken message stating the nature of the emergency and the action to be taken by the public. These emergency messages are stored as downloadable ringtones. They may be sent to communication devices and played as ringtones. By this, the emergency messages will be audible to the user of any of the plurality of communication devices and possibly also to the people close to the said user.

Preferably, the communication devices are mobile wireless communication devices, e.g. based on the GSM or UMTS standard. In general, all communication devices that can receive and play ringtones can be deployed as emergency alert devices.

According to another aspect of the invention, a command center, which is sending out the emergency message, has means to determine the identifiers, e.g. the telephone numbers, of the plurality of active communication devices in an emergency area. Furthermore, according to another aspect of the invention, the command center has means to identify the types, e.g. the manufacturer and the model number, of the plurality of communication devices.

According to another aspect of the invention, the emergency alert method and the emergency system can make use of existing mobile communication networks, such as GSM and UMTS.

According to another aspect of the invention, the command center can send scripts to the plurality of communication devices which initiate the emergency message to be played back. Such scripts may also be used to configure other parameters of the communication devices, such as its speaker volume or a repeater loop for the played back emergency message.

According to another aspect of the invention, a joint protocol between the command center, which issues the emergency message, and the communication devices is provided. The protocol enables the communication devices to receive emergency messages from the command center and enables the command center to initiate the emergency messages to be played back aloud on the communication devices.

Figure 2:
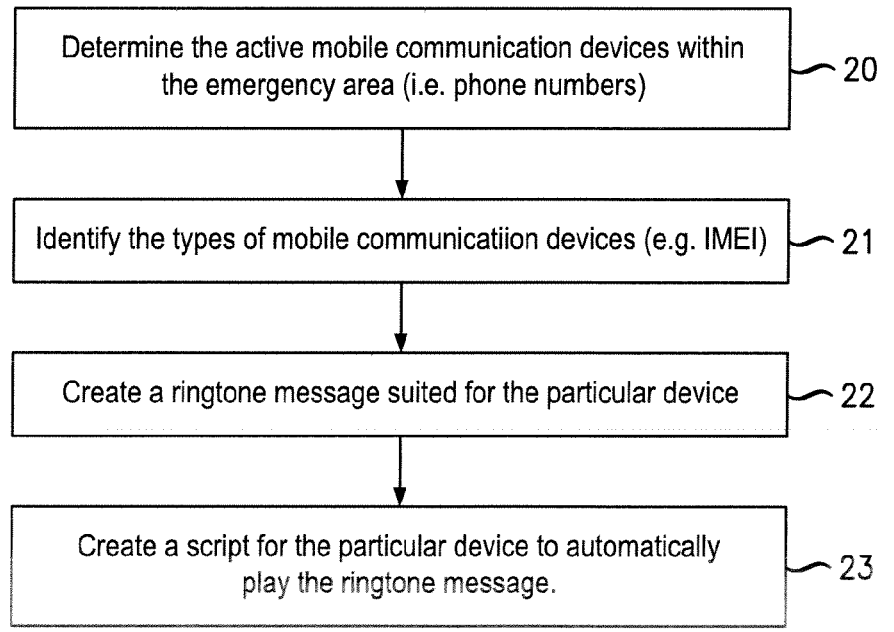

The features and advantages of the invention will become apparent from the following description of preferred embodiments. The present invention is described in the following by referring to exemplary embodiments illustrated schematically in the accompanying figures, wherein FIG. 1 illustrates an emergency warning system according to an embodiment of the invention which is using downloadable ringtones to mobile communication devices for emergency communication;

FIG. 2 is a flow diagram illustrating steps to generate an emergency message. In case of an emergency the command center 10, shown in FIG. 1, intends to provide an emergency message 14 to the people living in a specific area. By way of example, this area is equivalent to the coverage area of the base station 11. It is clear, that in general an emergency area will correspond to the coverage area of a plurality of base stations. Using positioning techniques known to a person skilled in the art, it is also possible to select fractional cells, if an emergency only concerns subsets of the coverage area of a base station. Overall, it is possible to select an arbitrary coverage area that suits best the particular needs of a given emergency situation.

The emergency message 14 may comprise a warning tone and a voice message. The voice message could give exact information on the emergency situation and clear instructions on what the receiver of the message needs to do. A person skilled in the art of designing such emergency messages will know how to design such a message, in order to yield the desired reaction of the receiver. It may also be desirable to adapt to instructions given in the emergency message 14 to the exact position of a mobile communication device 12. By way of example, the directions given to an individual for leaving the emergency area may depend on his or her position.

The command center 10 can retrieve the identifiers, e.g. the telephone numbers, of the plurality of active mobile communication devices 12 within the coverage area of the base station 11 through the information stored in the central office equipment of the respective operator. This central office equipment is shown in FIG. 1 as an exemplary Home Location Register (HLR)/Visiting Location Register (VLR) 13 for the case of a GSM network. Mobile networks using other standards (e.g. UMTS) will provide other means of retrieving the identifiers, e.g. the telephone numbers, of the active mobile communication devices 12. Due to the fact that a certain emergency area will most likely be covered by several wireless networks, the command center 10 will have to contact all the respective operators, in order to obtain the complete set of active users in the emergency area.

Different mobile communication devices 12 may require different ringtone formats. Therefore it may be necessary to adapt the emergency message to the type of mobile communication device that it will be sent to. In FIG. 2 a flow diagram illustrates, which steps might be required. As already outlined above, the telephone numbers of the active communication devices in the emergency area are retrieved in step 20. In a next step, the related type, i.e. the brand and the model number, of the mobile communication device is retrieved 21. Within GSM networks, each mobile communication device is uniquely identified by the International Mobile Equipment Identity (IMEI) number. Other wireless network standards may provide other means of identifying the type of the mobile communication device.

In step 22 the emergency message 14 is adapted to the data format readable and possibly executable by the specific mobile communication device. Such data formats may include MP3, WAV, or RTTL (Ringtone Transfer Language), the latter one for transmitting a possible warning signal. It should be highlighted that for mobile communication devices that are not enabled to receive and/or read audio message data formats, the emergency message could simply comprise a warning signal, transmitted via a ringtone format adapted to the specific mobile communication device. A person skilled in the art of designing ringtones will know how to best adapt the emergency message to a format readable by a particular mobile communication device.

In the next step, the adapted emergency message 14 is sent to the mobile communication device 12 in a ringtone format compatible with the particular device. In order to ensure that the emergency message 14 is played immediately upon receipt by the mobile communication device 12, it may be necessary, as indicated in step 23 of FIG. 2, to create a script for the particular mobile communication device 12, which places the emergency message 14 as a ringtone in the memory of the mobile communication device 12 and which then provokes the ringtone to be played. Such scripts might be sent by the command center 10 to the mobile communication device 12 in case of an emergency, or they might be stored already within the mobile communication devices 12.

More precisely, the script could create an entry into the address book of the mobile communication device 12. This entry could be named "Emergency Command Center" and store the number of the emergency command center. Furthermore, the script could link the emergency message 14 as the ringtone to this newly created address book entry. Finally, the script would ensure that the ringtones are enabled on the mobile communication device 12. Setting up a call from the command center 10 to the mobile communication device 12 would then trigger the play back of the emergency message 14. Alternatively, the script could also trigger directly the play back of the emergency message.

In another embodiment of the invention, a joint protocol for transmitting emergency messages to mobile communication devices, which are immediately played upon receipt, might be established between the manufactures of mobile communication devices and the authorities. Such a protocol could define a joint data format for an emergency message 14 in order to simplify the data exchange between the command center 10 and the mobile communication device 12. Furthermore, a certain number of commands could be specified, such as SEND, for sending an emergency message 14 to a mobile communication device 12, ACKNOWLEDGE, used by the mobile communication device 12 to acknowledge receipt of the emergency message 14, and PLAY, to instruct the mobile communication device 12 to play back aloud the emergency message.

By way of example, concepts for the transmission of ringtones, which may be applied in the present invention, are provided in the Session Initiation Presentation (SIP) protocol, specified in the IETF RFC 3261. This protocol relates to the session setup over an IP network between two User Agent Clients (UAC), via a User Agent Server (UAS). A UAC may be any kind of IP enabled communication device, such as a PC or a SIP phone. The present invention allows using all SIP enabled user equipment as alarm devices to alert users in emergency situations.

The SIP protocol specifies an Alert Info header field within its INVITE request, which may be used to define a user-specific ringtone. The field may refer to an http site, from where the respective ringtone is downloaded by the B-side UAC. As stated in RFC 3261, the main purpose of the Alert Info header field is to provide a distinctive ringtone features which uniquely identifies the A-side UAC. Furthermore, it is stated that the B-side UAC should be able to disable this feature in order to prevent possible security disruptions. In addition, the B-side UAC has an option to ignore the Alert Info header field and to play a locally generated ringtone. A joint protocol for use in an emergency alert system should explicitly exclude these possibilities and/or allow the command center 10 to overwrite such possibilities.

In the present invention, a method and a system for transmitting emergency messages as a ringtone to mobile communication devices has been disclosed. By using such a system, the indirection, usually linked to emergency situations, can be significantly reduced. In contrary to alert systems, such as air raid sirens, the emergency message is used to carry information about the emergency itself and about the actions to be taken, instead of only notifying the population that there is an emergency. Providing details directly can save precious time. Furthermore, the disclosed alert system can be used to provide a sense of urgency that is necessary in this kind of situations. In addition, the message may be heard by others than the person carrying the mobile communication device on which the alert has been received.

This written description uses examples to disclose the invention, including the best mode, and also to enable any person skilled in the art to make and use the invention. While the invention has been described in terms of various specific embodiments, those skilled in the art will recognise that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. A method for informing the population of a defined area about an emergency situation, the method comprising: generating a spoken message related to the emergency; determining an identification of at least one mobile communication device in the defined area; formatting the spoken message as a ringtone that is compatible with the at least one mobile device; sending the spoken message ringtone and a trigger to the at least one mobile communication device, wherein the spoken message ringtone is made available to the at least one mobile device for automatic play back aloud as a ringtone alert and wherein the trigger comprises a respective mobile communication device specific script that is operative to initiate the play back of the emergency message.

2. The method according to claim 1, wherein the emergency message comprises a warning signal.

3. The method according to claim 1, further comprising:
determining a respective ringtone format that is compatible with each respective one of the at least one mobile communication device and adapting the emergency message to a respective data format that can be played back by the respective one of the at least one mobile communication device.

4. The method according to claim 1, comprising:
using a joint protocol to communicate between the at least one mobile communication device and a command center, wherein the joint protocol allows the command center to transmit the emergency message to the plurality of communication devices as a ringtone and to initiate the emergency message to be played back aloud on the plurality of communication devices.

5. The method according to claim 1, wherein the communication network is a GSM network or a UMTS network.

6. A command center used within an emergency alert system comprising: at least one processor configured as: an identifier that is operative to determine identifications of a plurality of communication devices positioned within an emergency area; a message processor that is operative to accept or create a plurality of emergency messages, each message of the plurality including a spoken message and one of the determined mobile communications device identifiers; a message disseminator that is operative to send the plurality of emergency messages to the plurality of communication devices in a format of a ringtone based upon the determined identifications; and a trigger disseminator that is operative to disseminate at least one trigger to cause that the plurality of emergency messages to played back aloud by the plurality of communication devices wherein each trigger comprises a respective mobile communication device specific script that is operative to initiate the play back of the emergency message.

\* \* \* \* \*